United States Patent
Lagler et al.

(10) Patent No.: US 12,359,723 B2
(45) Date of Patent: *Jul. 15, 2025

(54) SEALING DEVICE FOR A PISTON ROD OF A RECIPROCATING COMPRESSOR

(71) Applicant: Hoerbiger Wien GmbH, Vienna (AT)

(72) Inventors: Martin Lagler, Vienna (AT); Andreas Kaufmann, Vienna (AT); Guido Pratelli, Vienna (AT)

(73) Assignee: Hoerbiger Wien GmbH, Vienna (AT)

( * ) Notice: Subject to any disclaimer, the term of this patent is extended or adjusted under 35 U.S.C. 154(b) by 109 days.

This patent is subject to a terminal disclaimer.

(21) Appl. No.: 17/988,369

(22) Filed: Nov. 16, 2022

(65) Prior Publication Data

US 2024/0159236 A1 May 16, 2024

(51) Int. Cl.
*F16J 15/16* (2006.01)
*F04B 19/22* (2006.01)
(Continued)

(52) U.S. Cl.
CPC ............ *F16J 15/164* (2013.01); *F04B 19/22* (2013.01); *F04B 39/041* (2013.01);
(Continued)

(58) Field of Classification Search
CPC ........ F04B 19/22; F04B 39/041; F04B 49/00; F16J 15/002; F16J 15/004; F16J 15/164;
(Continued)

(56) References Cited

U.S. PATENT DOCUMENTS 3,403,917 A * 10/1968 MacSpadden, Jr. ..... F16J 15/20
277/540
4,469,017 A 9/1984 Hanlon
(Continued)

*Primary Examiner* — Matthew Wiblin
(74) *Attorney, Agent, or Firm* — Dykema Gossett PLLC

(57) ABSTRACT

In order to provide a sealing device (15) for sealing a piston rod (8) of a reciprocating compressor (1) at compressor standstill, which enhances the safety of operation, the sealing device (15) comprises a number of first packing retainers (18), each retainer including a retaining opening (18a) in which a first packing ring (19) is arranged, a second packing retainer (20), including a retaining opening (20a) in which a second packing ring (21) is arranged, the second retainer (20) being positioned closer to the second axial device end (15a) than the number of first packing retainers (18) in an axial direction of the sealing device (15), wherein the second packing ring (21) is an uncut ring, comprising a continuous inner circumferential sealing surface (21a), the second packing ring (21) being configured to seal the piston rod (8) at standstill of the compressor (1), wherein the sealing device (15) further comprises a support passage (28) having a first support passage end (28a), a second support passage end (28b) and a valve (29) for opening and closing the support passage (28), the support passage (28) being configured to vent at least a gas, leaking from the first axial device end (15a) in the direction of the second axial device end (15b) past at least one of the number of first packing rings (19), from the first support passage end (28a) to the second support passage end (28b), wherein the sealing device (15) further comprises an unobstructed vent passage (31) having a first vent passage end (31a) and a second vent passage end (31b), the vent passage (31) being configured to vent a gas, leaking from the first axial device end (15a) in the direction of the second axial device end (15b) past the second packing ring (21), from the first vent passage end (31a) to the second vent passage end (31b).

19 Claims, 7 Drawing Sheets

(51) Int. Cl.
   *F04B 39/04* (2006.01)
   *F16J 15/00* (2006.01)
   *F16J 15/18* (2006.01)
   *F16J 15/20* (2006.01)
   *F16J 15/32* (2016.01)
   *F16J 15/3236* (2016.01)
   *F16J 15/3252* (2016.01)

(52) U.S. Cl.
   CPC ........... *F16J 15/002* (2013.01); *F16J 15/004* (2013.01); *F16J 15/181* (2013.01); *F16J 15/188* (2013.01); *F16J 15/20* (2013.01); *F16J 15/32* (2013.01); *F16J 15/3236* (2013.01); *F16J 15/3252* (2013.01)

(58) Field of Classification Search
   CPC ........ F16J 15/181; F16J 15/182; F16J 15/188; F16J 15/20; F16J 15/3236; F16J 15/3252
   See application file for complete search history.

(56) References Cited

U.S. PATENT DOCUMENTS

| | | | |
|---|---|---|---|
| 4,553,759 A * | 11/1985 | Kilmoyer | F16J 15/164 277/529 |
| 5,984,316 A * | 11/1999 | Balsells | F16J 15/3216 277/553 |
| 6,547,250 B1 * | 4/2003 | Noble | F16J 15/164 277/471 |
| 6,932,351 B1 * | 8/2005 | Mowll | F04B 39/0022 277/517 |
| 9,016,109 B1 | 4/2015 | Miguez et al. | |
| 10,883,483 B2 | 1/2021 | Chalk | |
| 2008/0012236 A1 * | 1/2008 | Reilly | F16J 15/26 277/318 |
| 2012/0211945 A1 * | 8/2012 | Lindner-Silwester | F04B 39/041 277/508 |
| 2013/0259679 A1 | 10/2013 | Brailean | |
| 2018/0112778 A1 * | 4/2018 | Dilmaghanian | F16J 15/3284 |
| 2019/0309853 A1 * | 10/2019 | Lenhert | F16J 15/56 |
| 2020/0386218 A1 * | 12/2020 | Feistel | F16J 15/26 |
| 2021/0025378 A1 * | 1/2021 | Chen | F04B 39/045 |

* cited by examiner

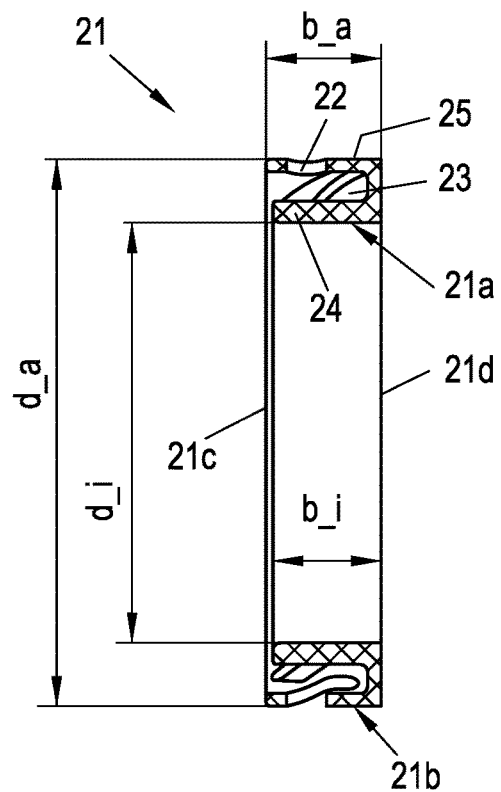
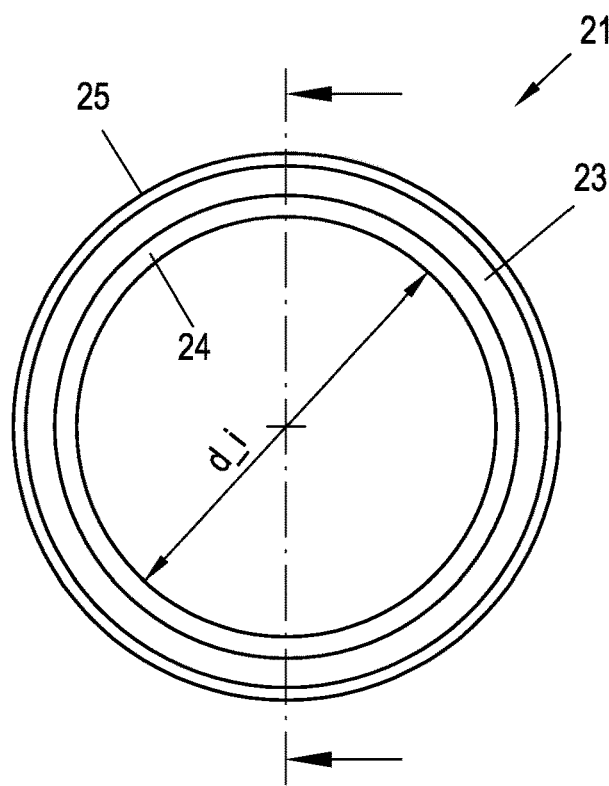
Fig. 3a
Fig. 3b
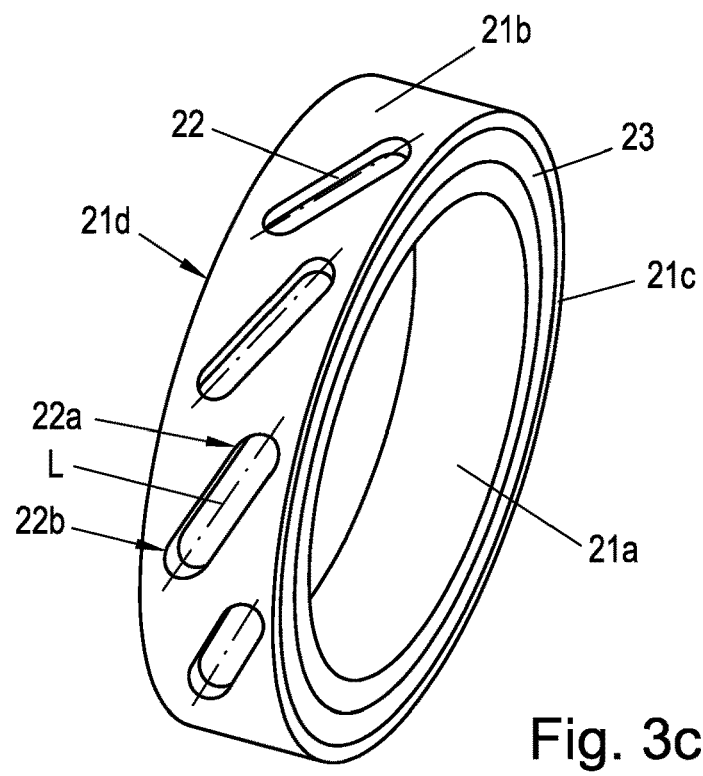
Fig. 3
Fig. 3c

SEALING DEVICE FOR A PISTON ROD OF A RECIPROCATING COMPRESSOR

The invention relates to sealing device for sealing a piston rod of a reciprocating compressor, the sealing device comprising a first axial device end, configured to face toward a cylinder of the compressor, and an opposite second axial device end, configured to face toward a crankcase of the compressor, a number of first packing retainers, each retainer including a retaining opening in which a first packing ring is arranged, a second packing retainer, including a retaining opening in which a second packing ring is arranged, the second retainer being positioned closer to the second axial end than the number of first packing retainers in an axial direction of the sealing device, wherein the second packing ring is an uncut ring, comprising a continuous inner circumferential sealing surface, the second packing ring being configured to seal the piston rod at standstill of the compressor, wherein the sealing device further comprises a support passage having a first support passage end, a second support passage end and a valve for opening and closing the support passage, the support passage being configured to vent a gas, leaking from the first axial device end in the direction of the second axial device end past at least one of the number of first packing rings, from the first support passage end to the second support passage end. The invention further relates to a reciprocating compressor including such a sealing device as well to a method for operating such a piston compressor.

BACKGROUND

In a reciprocating piston compressor sealing devices are used to seal the compression chamber in cylinder against the crank case or the distance piece respectively. Such sealing devices comprise a number of packing retainers, often formed in a circular plate like fashion, in each of which retainers a retaining opening as arranged. In each retaining opening a packing ring is arranged, which during operation of the compressor cooperates with an outer circumferential surface of a piston rod in order to form a sealing barrier. During operation of the compressor, the piston rod predominantly executes a reciprocating movement relative to the sealing device in an axial direction of the cylinder. Often packing rings, which consist of multiple segments, are used. However, such segmented packing rings are typically activated only during operation by a differential pressure between a high pressure in the compression chamber and a low pressure in the crankcase in order to form the sealing barrier.

At standstill of the compressor however, such segmented rings are typically (at least partially) deactivated. This is due to the fact, that, although there is still a certain differential pressure present, the sealing surfaces of the segmented rings do not conform to the outer surface of the piston rod anymore, when the piston rod cools down after shutdown. This is essentially a result of the segmented rings and the piston rod having different thermal expansions. Therefore, in the cold state, e.g., at ambient temperature, a certain gap is created between the segmented rings and the piston rod in, which gaps form a leakage passage.

Hence, at standstill with such segmented packing rings, no sufficient sealing barrier can be established. This however is disadvantageous, because at standstill the gas, which is contained inside the compression chamber, can leak from the compression chamber in the axial direction past the sealing device in the direction of the crankcase, e.g., into the distance piece. While in some cases, such leakage is unproblematic, e.g., when air is used as the compression gas, it could lead to a variety of problems, when other gases, such as flammable or toxic gases are used. When for instance a flammable gas, such as natural gas, is compressed, leakage needs to be prevented on the one hand for safety reasons, in order to avoid a possible flammable atmosphere to be created in the distance piece or in the environment surrounding the compressor. On the other hand, leakage needs to be prevented also for environmental reasons, since the leakage of any greenhouse gases into the environment is unwanted and, in some cases, prohibited or at least limited.

In the past, a couple of different approaches were developed for solving this particular leakage problem at compressor standstill. In U.S. Pat. No. 10,883,483 B2 for example a sealing device is disclosed, which uses an unsegmented sealing ring, which is activated due to the residual differential pressure after shutdown when a valve in a vent line is closed. During operation of the compressor, the valve is opened and the sealing ring is relieved due to the missing differential pressure over the ring. However, when the sealing effect of the unsegmented seal decreases, e.g., because the unsegmented sealing ring wears out or breaks down, an unwanted leakage of gas past the worn or broken sealing ring and into the crankcase or distance piece occurs, since no venting through the vent line is possible due to the closed valve. While the gas from the vent line can be treated safely, e.g., sent to a burning device, the gas that accumulates in the distance piece is often untreated and might cause formation of explosive atmosphere and/or environmental damage due to release of greenhouse gas into the air.

It was therefore an object of the invention to provide a sealing device for sealing a piston rod of a reciprocating compressor at compressor standstill which enhances the safety of operation.

SUMMARY OF THE INVENTION

The object is achieved with the above-mentioned sealing device in that the sealing device further comprises an unobstructed vent passage having a first vent passage end and a second vent passage end, the vent passage being configured to vent a gas, leaking from the first axial device end in the direction of the second axial device end past the second packing ring, from the first vent passage end to the second vent passage end. This enhances the safety of the operation, because even in case of malfunction or breakdown of the second packing ring, gas can be prevented from flowing e.g., into the distance piece of the compressor, which could potentially create a hazardous environment, such as a combustible atmosphere.

According to a preferred embodiment, the first support passage end is connected to the retaining opening of the second packing retainer, preferably in a region radially outside of the second packing ring, or the first support passage end is located between the second packing ring and the first packing ring of the adjacent first packing retainer in an axial direction of the sealing device or the number of first packing retainers comprises at least two first packing retainers, wherein the first support passage end is located in the region of the first packing to ring, which is adjacent the second packing ring or between the first packing ring, which is adjacent the second packing ring and the first sealing device end in the axial direction of the sealing device. The first two alternatives enhance the design flexibility and are essentially similar in function. The third alternative can be advantageous in two ways. On the one hand, this configuration allows the first packing ring, that is adjacent the second packing ring, to provide an additional seal during the time between a shut-off of the compressor and the activation of the second packing ring, which is delayed due to necessary time for the thermal activation. On the other hand, the pressure-drop over the first packing ring, that is adjacent the second packing ring, can be used for cooling the second packing ring, which accelerates the thermal activation. In the latter, it is particularly preferable, if the respective first packing ring comprises a metal material.

Preferably the sealing device further comprises at least one third packing retainer including a retaining opening in which a third packing ring is arranged, wherein the at least one third packing retainer is arranged closer to the second axial device end of the sealing device than the second packing retainer, wherein the first vent passage end is connected to the retaining opening of the third packing retainer, preferably radially outside of the at least one third packing ring or wherein the first vent passage end is located between the second packing ring and the third packing ring in the axial direction of the sealing device. The third packing ring can further improve the safety, because an additional sealing barrier is created behind the second sealing ring.

Preferably the second vent passage end of the unobstructed vent passage and the second support passage end of the support passage are connected to a common discharge passage, which is connectable to a discharge space, preferably to a disposal system. This allows a single disposal system to be used for the gas coming from the support passage as well as the gas coming from the vent passage. The valve of the support passage in this case can of course only open/close the support passage, while the vent passage remains unobstructed.

Preferably the valve comprises an electrically controllable actuator, which can be controlled by a control unit in order to open and close the valve. This allows to open and close the support passage e.g., via the compressor control unit.

Preferably the valve further comprises a sensor configured to generate a sensor value, representative for an opening state of the valve. By this a closed control loop can be created, which allows e.g., the compressor not being started, when the valve is still closed.

In a preferred embodiment, the second packing ring is made from a material comprising a polymer, the material having a thermal expansion coefficient, which is at least two times higher than the thermal expansion coefficient of iron, wherein at or below a defined activation temperature an inner diameter of the second packing ring is smaller than an outer diameter of the piston rod to be sealed, such that in the mounted state of the sealing device in the compressor the second packing ring is prestressed in a radial direction in order to form a tight seal between the continuous inner circumferential sealing surface of the second packing ring and the outer circumferential surface of the piston rod, wherein at a given operating temperature, the inner diameter of the second packing ring is larger than the outer diameter of the piston rod, such that in the mounted state of the sealing device in the compressor the continuous inner circumferential sealing surface is detached from the outer circumferential surface of the piston rod in order to provide a leakage path between the inner circumferential surface of the second packing ring and the outer circumferential surface of the piston rod in the axial direction. This allows for an automatic thermally dependent activation and deactivation of the sealing effect of the second packing ring. By reducing the contact pressure between the second packing ring and the piston rod to zero during operation of the compressor, wear of the second packing ring is also minimized. Further, due to the thermal activation of the second packing ring, there is no need for a certain residual pressure to be present in the compression chamber at the time of shut-off of the compressor. This allows the sealing device of the invention to be applied in essentially any compressor application, regardless of the suction pressure of the cylinder. Hence, it essentially also works with a suction pressure below ambient (as in vacuum compressors). The sealing device of U.S. Pat. No. 10,883,483 B2 on the other hand necessarily requires a certain cylinder pressure to activate the unsegmented sealing ring, such that it cannot work on compressors whose suction pressure is the ambient pressure or below.

In a preferred embodiment, the thermal expansion coefficient of the material of the second packing ring is at least $30\times10^{-6} K^{-1}$, preferably at least $60\times10^{-6} K^{-1}$, in particular at least $90\times10^{-6} K^{-1}$. The region $30\times10^{-6} K^{-1}$ and above was found to provide a suitable expansion.

The operating temperature is preferably 90° C. or above and/or the activation temperature is preferably 80° C. or below, wherein the operating temperature and the activation temperature are temperatures in the region of the piston rod, in particular a temperature of the outer circumferential surface the piston rod. This allows a good sealing effect at standstill and a sufficient expansion for detachment of the second packing ring from the piston rod.

In a preferred embodiment the second packing ring has a first axial end and an opposite second axial end, wherein the second packing ring is arranged in in the retaining opening of the second packing retainer, such that the first axial end faces towards the first axial device end of the sealing device and wherein the second packing ring comprises one of: a U-shaped cross section comprising an inner shank and an outer shank, which are spaced apart in the radial direction, wherein the inner circumferential sealing surface of the second packing ring is provided on the inner shank and a radially outer circumferential surface is provided on the outer shank of the second packing ring, wherein an open side of the U-shape faces toward the first axial end of the second packing ring in the axial direction; an L-shaped cross section comprising an axial shank and a radial shank, wherein the inner circumferential sealing surface of the second packing ring is provided on the axial shank and a radially outer circumferential surface of the second packing ring is provided on the radial shank, wherein the radial shank is arranged at the second axial end of the second packing ring; a rectangular cross section, wherein a number of openings are provided on the second packing ring, which openings in each case connect the first axial end of the second packing ring with an outer circumferential surface of the second packing ring. Thereby different preferred shapes are provided, such that the second packing ring can be flexibly adapted to different applications.

When the second packing ring has a U-shaped profile, a number of openings are preferably provided on the outer shank, wherein each of the number of openings connects an inside space of the U-shaped packing ring with the radially outer circumferential surface of the second packing ring, the inside space lying between the inner shank and the outer shank in the radial direction, wherein the openings are spaced from the opposite axial ends, of the second packing ring. When openings are provided, the number of openings preferably comprise a number of elongated holes or elliptical holes, wherein each elongated hole or elliptical hole preferably comprises a longitudinal axis, a first hole end and an opposite second hole end in the direction of the longitudinal axis, wherein the first hole end is closer to the first ring end than the second hole end. Preferably in the unmounted state of the second packing ring, a length of the inner shank in the axial direction is smaller than a length of the outer shank in the axial direction. The openings allow gas to flow past the second packing ring. Further, the openings give the second packing ring a certain flexibility in the axial direction. This permits a tight seat of the second packing ring in the retaining opening of the second packing retainer, essentially independent from axial thermal expansion.

The material of the second packing ring is preferably a fiber-reinforced composite material. This enhances the mechanical strength of the second packing ring. Additionally, or alternatively the polymer of the material of the second packing ring preferably comprises at least one of: polytetrafluoroethylene, polyphenylene sulphide, polyether ether ketone, polyimide, polyamide. Those polymers provide sufficient rigidity and have favorable tribological properties.

In a preferred application, at least one sealing device according to the invention is preferably used in a reciprocating piston compressor, which comprises a number of cylinders, in each of which cylinders a piston is arranged, that is movable in a reciprocating manner. Each piston is connected to a piston rod, wherein for at least one cylinder of the number of cylinders, the sealing device according to the invention is arranged for sealing the respective piston rod, wherein the sealing device is arranged such that the first axial device end faces towards the cylinder and the second axial device end faces towards a crankcase of the compressor. If the compressor comprises more than one cylinder, preferably for each cylinder a sealing device according to the invention is arranged.

The compressor preferably comprises a compressor control unit for controlling an operation of the compressor, wherein the control unit is further configured to control the electrically controllable actuator of the valve of the support passage dependent on an operation condition of the compressor. By this, the opening/closing of the valve can be coupled to the operation condition of the compressor.

In a preferred embodiment the compressor comprises an operation condition sensor, configured to detect a sensor value, representative for an operation condition of the compressor, preferably a temperature sensor or a movement sensor, wherein the electrically controllable actuator of the valve of the support passage is configured to control the valve dependent on the sensor value or wherein the control unit is configured to control the electrically controllable actuator of the valve dependent on the sensor value. This allows to open/close the valve dependent on preferred conditions of the compressor.

Preferably the compressor also comprises a drive unit for driving the compressor, wherein the compressor control unit is configured to send a start signal to the drive unit for starting the operation of the compressor and to send an opening signal to the actuator of the valve of the support passage for opening the valve simultaneously with the start signal or a predetermined or adjustable opening lead time before the start signal, wherein the opening lead time is preferably in the range between 0 to 60 seconds. Additionally, or alternatively the control unit is preferably configured to send a stop signal to the drive unit for stopping the operation of the compressor and to send a closing signal to the actuator of the valve of the support passage for closing the valve simultaneously with the stop signal or after a predetermined or adjustable closing delay time after the stop signal, wherein the closing delay time is preferably in the range between 0 to 120 seconds. In this way, the opening/closing of the valve can be directly coupled to the starting/stopping of the drive unit.

The object of the invention is also achieved with the method for operating a reciprocating piston compressor, the compressor comprising a number of cylinders, in each of which cylinders a piston is arranged, that is movable in a reciprocating manner, wherein each piston is connected to a piston rod, wherein for each cylinder of the number of cylinders, a sealing device for sealing the respective piston rod is provided, which device comprises a first axial device end a, facing toward the respective cylinder, and an opposite second axial device end, facing toward a crankcase of the compressor, wherein at least one sealing device of the number of sealing devices comprises a number of first packing retainers, each retainer including a retaining opening in which a first packing ring is arranged, a second packing retainer, including a retaining opening, in which a second packing ring is arranged, the second retainer being positioned closer to the second axial device end than the number of first packing retainers in an axial direction of the sealing device, wherein the second packing ring is an uncut ring, comprising a continuous inner circumferential sealing surface, wherein the sealing device further comprises a support passage having a first support passage end, a second support passage end and a valve for opening and closing the support passage, wherein the sealing device further comprises an unobstructed vent passage having a first vent passage end and a second vent passage end, the method comprising: during operation of the compressor deactivating a seal between the piston rod and the inner circumferential sealing surface of the second packing ring, opening the valve of the support passage, venting a gas, leaking from the cylinder in the direction of the crankcase past at least one of the number of first packing rings, from the first support passage end to the second support passage end of the support passage and venting a gas, leaking from the cylinder in the direction of the crankcase past the second packing ring, from the first vent passage end to the second vent passage end of the unobstructed vent passage or during standstill of the compressor activating a seal between the piston rod and the inner circumferential sealing surface of the second packing ring, closing the valve of the support passage and venting a gas, potentially leaking from the cylinder in the direction of the crankcase past the second packing ring, from the first vent passage end to the second vent passage end of the unobstructed vent passage.

BRIEF DESCRIPTION OF THE DRAWINGS

The present invention is explained in more detail below with reference to FIGS. 1 to 4c, which show exemplary, schematic, and non-limiting advantageous embodiments of the invention. Wherein.

DETAILED DESCRIPTION

Figure 1:
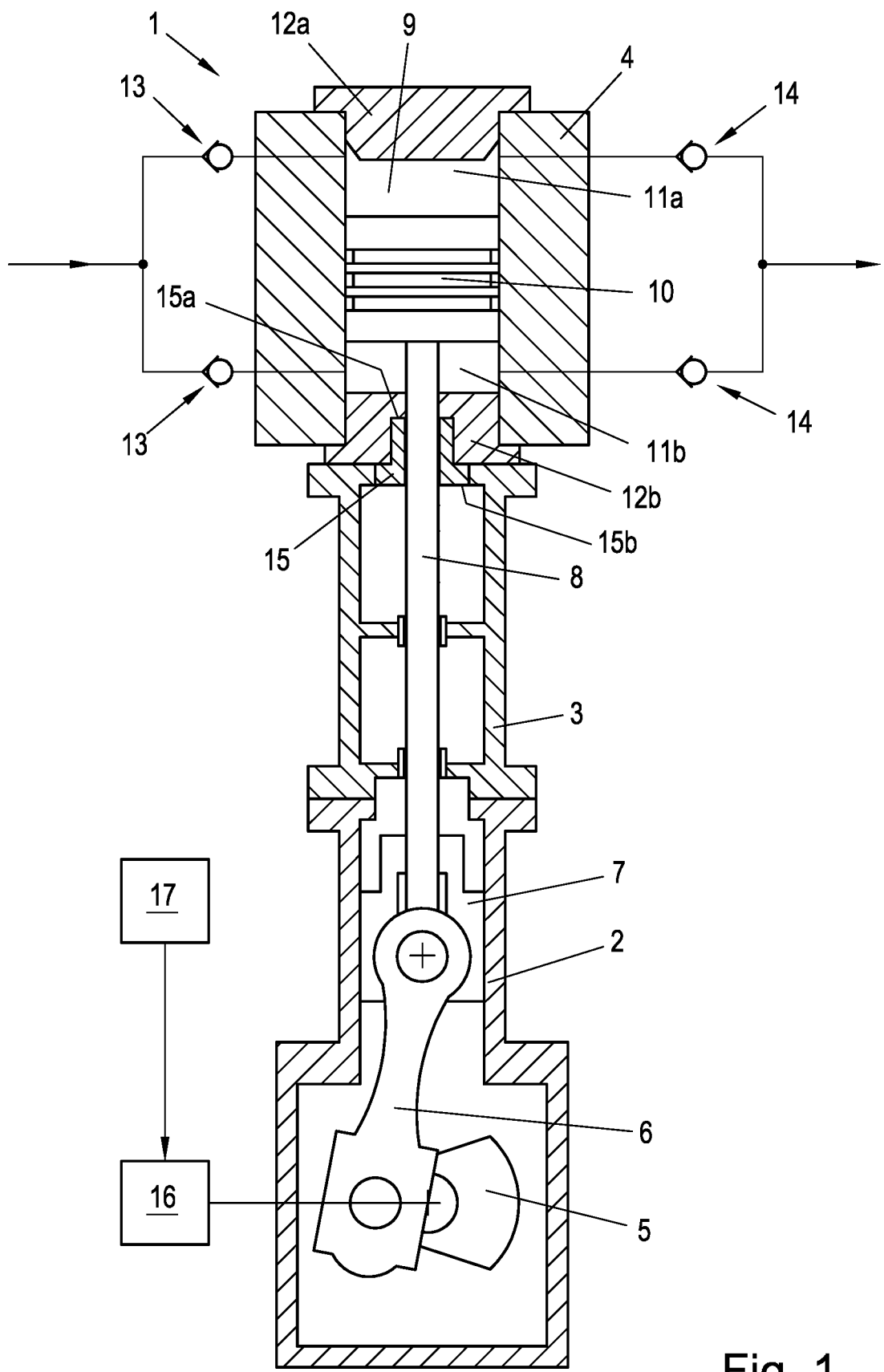
FIG. 1 shows a reciprocating piston compressor comprising a sealing device according to the invention in an advantageous embodiment, FIG. 2a-2d each show a section view of the sealing device according to the invention in a preferred embodiment, FIG. 3a-3c the second packing ring in an advantageous embodiment, FIG. 4a-4c further preferred embodiments of the second packing ring.

In FIG. 1 an exemplary reciprocating piston compressor 1 is shown. In the following for the sake of simplicity the word compressor is used. The compressor 1 comprises a compressor casing, which in this example includes a crankcase 2, a distance piece 3 and a cylinder housing 4. However, the distance piece 3 is only optional and the compressor 1 could also be designed without a distance piece 3. In the crankcase 2 a crankshaft 5 is arranged, which can rotate about an axis of rotation. The crankshaft 5 is connected to a connecting rod 6, which is in turn connected to a cross-head 7. The cross-head 7 is mounted in the crank case 2 by means of a suitable bearing, such that a cross-head 7 can perform an axial movement. The cross-head 7 is connected to a piston rod 8, which extends through the distance piece 3 and into a cylinder, 9 which is arranged in the cylinder housing 4. In the cylinder 9 a piston 10 is arranged, which is connected to the piston rod 8. The depicted compressor 1 is designed as a single cylinder compressor. However, the compressor 1 can of course also comprise multiple cylinders 9, in each of which cylinders 9, a piston is arranged, that is connected to the common crankshaft 5 by means of a piston rod 8. For the sake of simplicity, the invention is described in connection with one cylinder 9 only.

The compressor 1 is designed as a double acting compressor, wherein the piston divides the cylinder 9 into a first compression chamber 11a facing away from the crankshaft 5 and a second compression chamber 11b facing towards the crankshaft 5. The first compression chamber 11a is closed in the axial direction by means of a first cylinder head 12a and the second compression chamber 11b is closed in the axial direction by means of a second cylinder head 12b. For each compression chamber 11a, 11b at least one inlet valve 13 and at least one outlet valve 14 is provided in the cylinder housing 4. The inlet valves 13 and the outlet valves are only shown in a simplified way. The valves 13, 14 can for example be designed as automatic valves or could also comprise electrically controllable actuators for opening and closing. If the inlet valves are designed as automatic valves, valve unloaders (not shown) can additionally be provided, which are configured for keeping the respective valve in an open state independent of the pressure difference, acting on the valve. The valve unloader can comprise an electrically controllable actuator for activating the valve unloader.

A suitable drive unit 16 is also provided for driving the crankshaft 5 of the compressor 1. For the sake of simplicity, the drive unit 16 is only shown in a schematic fashion. The drive unit 16 can for instance comprise a suitable electric motor, a combustion engine, or another suitable drive. In case of an electric motor, an electric power source is of course also provided for supplying electric energy (not shown). The compressor 1 further comprises a compressor control unit 17, which is configured to control different functions of the compressor 1. In the following the abbreviated wording "control unit" will be used for sake of simplicity. Via the control unit 17 the drive unit 16 can be controlled in order to start or stop the operation of the compressor 1 or in order to control the running speed of the compressor 1. The control unit 17 can comprise suitable hardware and/or software. The control unit 17 can e.g., also be configured to control the mentioned actuators of the inlet valves 13 and outlet valves 14 or the actuators of the valve unloaders. Of course, further available functions of the compressor 1, such as an oil supply to the cylinder, could also be controlled by the control unit 17. Also monitoring functions could be controlled, such as processing sensor values or the like.

Further the compressor 1 comprises a sealing device 15 for sealing the piston rod 8. If the compressor 1 comprises multiple cylinders 9, of course a sealing device 15 is provided for the piston rod 8 of each cylinder 9. The sealing device 15 comprises a first axial device end 15a, which faces towards the cylinder 9 and comprises an opposite second axial device end 15b which faces towards the crankcase 2. In the example shown, the first device end 15a is arranged in the second cylinder head 12b the second device end 15b is arranged in the distance piece 3. Of course, the position can vary depending on the design of the compressor 1. The sealing device 15 is essentially formed cylindrically and comprises a number of packing retainers, which are essentially formed in a disc like manner. Each packing retainer can include a retaining opening, in which a packing ring can be arranged (not shown in FIG. 1). The packing rings surround the piston rod 8 in order to form a sealing barrier. The sealing device 15 according to the invention will now be described in greater detail in connection with FIG. 2a-FIG. 2d.

Figure 2A:
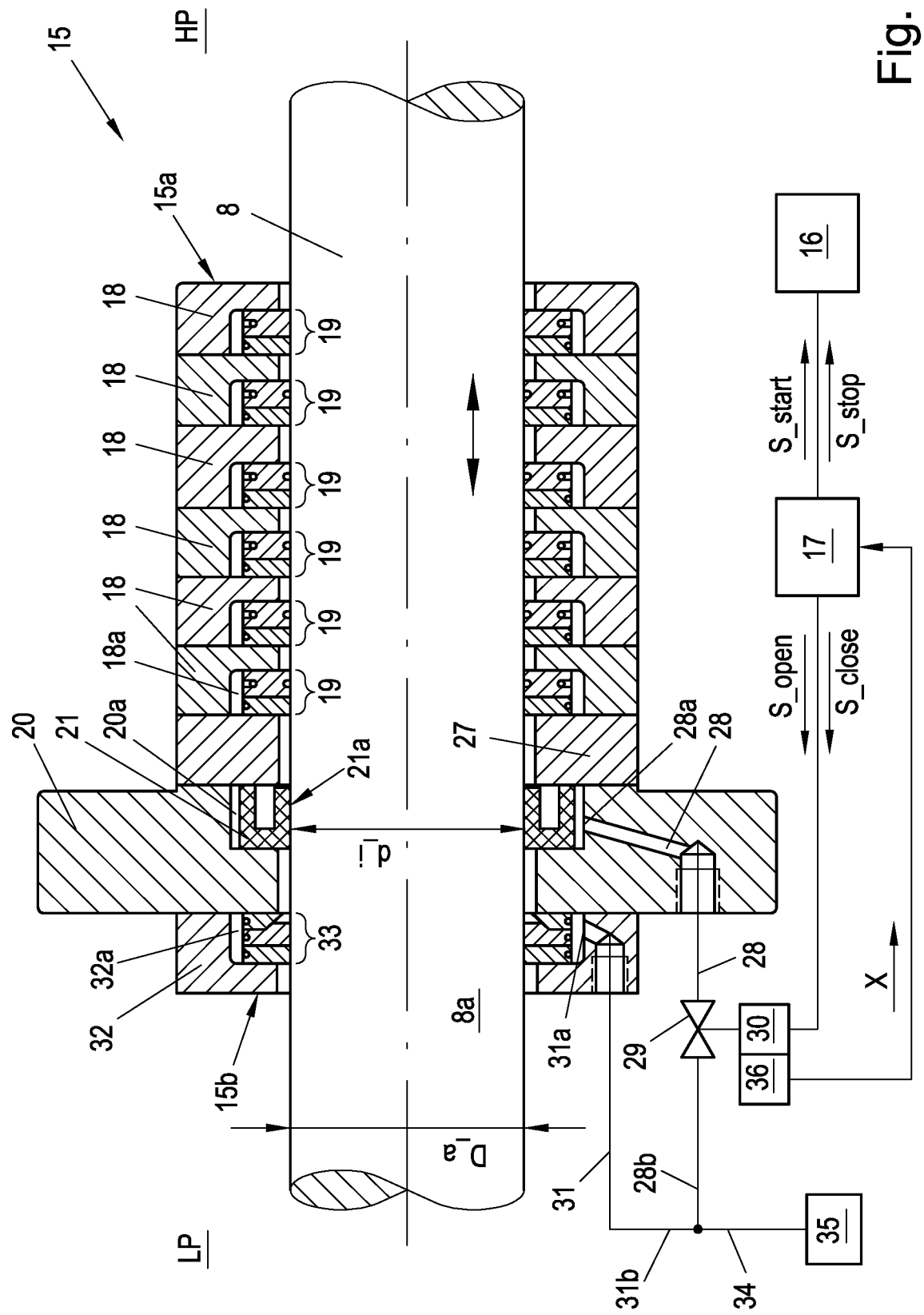

FIG. 2a shows a section view of the sealing device 15 of FIG. 1 according to an exemplary embodiment of the invention. The sealing device 15 comprises a first axial device end 15a, configured to face toward a cylinder 9 of the compressor 1, which represents a high-pressure side HP. The sealing device 15 comprises an opposite second axial device end 15b, configured to face toward a crankcase 2 of the compressor 1 or the distance piece 3 respectively. The sealing device 15 comprises a number of first packing retainers 18, each retainer 18 including a retaining opening 18a, in which a first packing ring 19 is arranged. Each of the first packing rings is configured for sealing the piston rod 8 during operation of the compressor 1. The retaining opening 18a is only indicated for one packing retainer 18 in FIG. 2a. The first packing retainers 18 can have the shape of a cylindrical disc and can be made of a suitable material such as steel or a steel alloy.

Each of the first packing rings 19 can for example comprise multiple ring segments in the axial direction (as indicated in FIG. 2a) and/or multiple ring segments in a circumferential direction (not shown). A first packing ring 19 can for example comprise a tangentially cut sealing ring and a radially cut sealing ring. The tangentially cut sealing ring can comprise a number of ring segments in the circumferential direction, which segments abut at cooperating sealing surfaces in the circumferential direction in order to form a seal in the radial direction. The radially cut sealing ring can comprises a number of ring segments in the circumferential direction, the segments being configured to overlap the tangential cuts of the tangentially cut ring, in order to form a seal in the axial direction. Also combined rings are known, which have both, tangential cuts and radial cuts. Further a so-called "backup-ring" could be arranged in the retaining opening 18a adjacent a first packing ring 19, which backup-ring can be uncut and which is configured to prevent the ring segments of the first packing ring 19, usually made from plastic from extrusion. However, backup rings are normally made of metal and do not serve for sealing the piston rod. Since those different packing rings are known in the art, no detailed description will be provided at this point. Of course, the number of first packing rings 19, arranged in the number of first packing retainers 18, do not necessarily need to be identical.

The sealing device 15 further comprises a second packing retainer 20, which includes a retaining opening 20a, in which a second packing ring 21 is arranged. The second packing ring 21 is an uncut ring, comprising a continuous inner circumferential sealing surface 21a in the circumferential direction. The second packing ring 21 is configured to be activated for sealing the piston rod 8 during standstill of the compressor 1 and to be deactivated during operation of the compressor 1. The sealing effect of the second packing ring 21 can e.g., be pressure-activated, similar as disclosed in U.S. Pat. No. 10,883,483 B2. Alternatively, and preferably, the sealing effect of the second packing ring 21 at standstill of the compressor 1 can however also be thermally-activated, as will be described in further detail below. The second packing ring 21 has a different design than the number of first packing rings 19. In an axial direction of the sealing device (corresponding to the axial direction of the piston rod 8), the second packing retainer 20 is positioned closer to the second axial device end 15b than the number of first packing retainers 18, as can be seen in FIG. 2a.

Between the second packing retainer 20 and the subsequent first of the first packing retainers 18, an intermediate plate 27 is arranged in the shown example. The intermediate plate 27 delimits the retaining opening 20a of the second packing retainer 20 in the axial direction and also delimits the retaining opening 18a of the subsequent first packing retainer 18 in the axial direction, which openings face each other. The intermediate plate 27 therefore separates the second packing ring 21, arranged in the retaining opening 20a of the second packing retainer 20, from the first packing ring 19, which is arranged in the retaining opening 18a of the adjacent first packing retainer 18. However, the arrangement of an intermediate plate 27 is only optional and it could also be omitted, e.g., if the first packing retainers 18 are arranged mirror-inverted.

As indicated in FIG. 2a., the second packing ring 21 can for example have a U-shaped cross section, wherein an open side of the U-shape faces toward the first axial device end 15a of the sealing device 15. The U-shape supports the ring deformation under pressure loading. For the same reason, the second packing ring 21 could also be L-shaped. However, also a ring with a solid cross section could generally be used as the second packing ring 21. Preferred embodiments of the second packing ring 21 will later be described in connection with FIG. 3a-4c.

According to a preferred optional embodiment of the invention, the second packing ring 21 can be made from a material comprising a polymer, which material has a thermal expansion coefficient $\alpha$, which is at least two times higher than the thermal expansion coefficient $\alpha_{FE}$ of iron. In a preferred embodiment the thermal expansion coefficient $\alpha$ of the second packing ring 21 is at least $\alpha=30\times10^{-6}$ K$^{-1}$, preferably at least $\alpha=60\times10^{-6}$ K$^{-1}$, in particular at least $\alpha=90\times10^{-6}$ K$^{-1}$. According to a preferred embodiment, the polymer comprises at least one of: polytetrafluoroethylene (known as PTFE), polyphenylene sulphide (known as PPS), polyether ether ketone (known as PEEK), polyimide (known as PI) or polyamide (known as PA). Of course, also a combination of different polymers is conceivable.

The second packing ring 21 is preferably designed, such that at (or below) a defined activation temperature an inner diameter d_i of the second packing ring 21 is smaller than an outer diameter D_a of the piston rod 8, such that the second packing ring 21 is prestressed in a radial direction in order to form a tight seal between the continuous inner circumferential sealing surface 21a of the second packing ring 21 and an outer circumferential surface 8a of the piston rod 8. The second packing ring 21 is further designed, such that at a given operating temperature, the inner diameter d_i of the second packing ring 21 is larger than the outer diameter D_a of the piston rod 8, such that the continuous inner circumferential sealing surface 21a is detached from the outer circumferential surface 8a of the piston rod 8 in order to provide a leakage path between the inner circumferential surface 21a of the second packing ring 21 and the outer circumferential surface 8a of the piston rod 8 in the axial direction. In FIG. 2a the cold state at ambient temperature is shown. Of course, in the mounted state of the second packing ring 21, the inner diameter d_i of the second packing ring 21 corresponds to the outer diameter D_a of the piston rod 8. However, in an unmounted state at ambient temperature, the inner diameter d_i of the second packing ring 21 would be smaller than the outer diameter D_a of the piston rod 8, such that an interference, similar to a press fit, exists.

The activation temperature, at which the second packing ring 21 is in its shrunk state and seals the piston rod 8, is typically 80° C. or below. The operating temperature, at which the second packing ring 21 is in its extended state and does not seal the piston rod 8, typically lies in the range of 90° C. and above. However, the activation temperature highly depends on the operating temperature of the compressor 1, which in turn can vary depending on the particular design and application of the compressor 1. Therefore, once the expected operating temperature is known, the design of the second packing ring 21 can be adapted to a desired activation temperature. The operating temperature and activation temperature are preferably temperatures in the region of the piston rod 8, in particular temperatures of the surface 8a of the piston rod 8.

Due to the above-described features, at (a sufficiently long) standstill of the compressor 1, the temperature of the second packing ring 21 as well as the temperature of the piston rod 8 decrease from the operation temperature to a temperature equal or below the activation temperature, e.g., the ambient temperature or a temperature between the activation temperature and the ambient temperature, such that the second packing ring 21 forms a tight sealing barrier on the surface 8a of the piston rod 8. Hence, no gas, which is still contained in the cylinder 9 can escape from the cylinder 9 in axial direction into the distance piece 3 and possibly further into the crankcase 5 or the surrounding environment.

After the compressor 1 is started, during operation of the compressor 1, the components of the compressor 1 begin to heat up due to the compression work and due to friction. In particular, the second packing ring 21 and the piston rod 8 are heated up due the friction, which results from the reciprocating motion of the piston rod 8 relative to the second packing ring 21 and also from the reciprocating motion of the piston rod 8 relative to the number of first packing rings 19. After a certain operating time, the operating temperature is reached, which essentially stays constant during further operation. Within the scope of the invention, "essentially constant" can mean, that the operating temperature has a certain variation, which can be in the range of around ±10° C. Due to the above-described features, upon reaching the operating temperature, the continuous inner circumferential sealing surface 21a of the second packing ring 21 detaches from the outer circumferential surface 8a of the piston rod 8, such that a leakage path between the inner circumferential surface 21a of the second packing ring 21 and the outer circumferential surface 8a of the piston rod 8 in the axial direction is created.

When the compressor 1 is again shut down, the reverse effect occurs. This means, that the components of the compressor 1 gradually cool down until the activation temperature is reached. Upon reaching of the activation temperature the second packing ring 21 is shrunk back onto the rod (d_i≤D_a), such that a tight sealing barrier is reestablished. Thus, it can be seen, that an automatic, essentially temperature-dependent, sealing effect is reached, without any control intervention being necessary. However, further advantageous features can be applied to the sealing device, in order to improve its performance, which features will be described in further detail below.

As shown in FIG. 2a, the second packing ring 21 preferably has a U-shaped cross section comprising an inner shank 24 an outer shank 25 in the radial direction, which shanks are spaced in the radial direction. A preferred embodiment of such a U-shaped second packing ring 21 is shown in detail in FIG. 3a-3c, wherein FIG. 3a shows a cross section, FIG. 3b shows a plan view and FIG. 3c shows an isometric view of the second packing ring 21. The second packing ring 21 has an outer diameter d_a, which is smaller than the diameter of the retaining opening 20a of the second packing retainer 20, in which the second packing ring 21 is to be arranged, as can be seen in FIG. 2a. Thus, a ring space is formed between the outer circumferential surface 21b of the second packing ring 21 and an inner circumferential surface of the cylindrical retaining opening 20a.

Further, in the example shown in FIG. 3a-3c a number of openings 22 are provided on the outer shank 25 of the second packing ring 21, wherein each of the number of openings 22 connects an inside space 23 of the U-shaped packing ring 21 with the radial outer circumferential surface 21b of the second packing ring 21. The inside space 23 is formed between the opposite shanks 24, 25 of the U-shape in the radial direction. The openings 22 therefore extend through the outer shank 25 and are spaced from opposite axial ends 21c, 21d of the second packing ring 21. The number of openings 22 can essentially have any suitable form, e.g., cylindrical drillings or groove-shaped millings. If the second packing ring 21 is for instance 3D-printed, also more complex forms could be used.

Preferably the number of openings 22 are shaped as elongated holes or elliptical holes, the elongated holes being shown in FIG. 3c. Each elongated hole comprises a longitudinal axis L and a first hole end 22a and an opposite second hole end 22b in the direction of the longitudinal axis L, wherein the first hole end 22a is preferably closer to the first ring end 21c than the second hole end 22b, which is closer to the second axial ring end 21d. Thus, the elongated holes 22 are essentially inclined relative to the front surfaces of the second packing ring 21, which are formed at the axial ring ends 21c, 21d. This shape is advantageous, because it makes the second packing ring 21 more flexible in the axial direction.

Further, the outer shank 25 of the U-shape has a length b_a in the axial direction which is preferably larger than a length b_i of the inner shank 24 in the axial direction. In the unmounted state, the length b_a of the outer shank 25 is preferably slightly larger than an axial length of the retaining opening 20a of the second packing retainer 20. In the example according to FIG. 2a, the axial length of the retaining opening 20a of the second packing retainer 20 is formed by a distance between an axial end face of the retaining opening 20a and the opposing axial end face of the intermediate plate 27, as can be seen in FIG. 2a. Due to the openings 22, the outer shank 25 has a certain structural elasticity, such that the outer shank 25 can be elastically deformed in the axial direction, which results in a tight seat inside the retaining opening 20a. The number of openings 22 as well as the arrangement of the openings 22 on the second packing ring 21 depend on the size of the ring and can vary. In the circumferential direction, the openings 22 are preferably equally distributed, in order to provide an elasticity in the circumferential direction, which is as uniform as possible.

In the radial direction however, the second packing ring 21 does not have such a structural elasticity, but is particularly rigid, such that even in the heated state at the operating temperature, essentially no (or negligibly small) elastic deformation due to a differential pressure occurs. Thereby, it is guaranteed, that at operating temperature, the inner diameter d_i of the second packing ring 21 is always larger than the outer diameter D_a of the piston rod 8, which results from the thermal expansion, as explained above. In order to enhance the structural rigidity also at higher temperatures, it can be advantageous, that the material of the second packing ring 21 is a fiber-reinforced composite material.

The embodiment according to FIG. 3a-3c is of course not limiting. As mentioned above, there are also other embodiments possible, some which are described below in connection with FIG. 4a-4c.

Figure 4C:
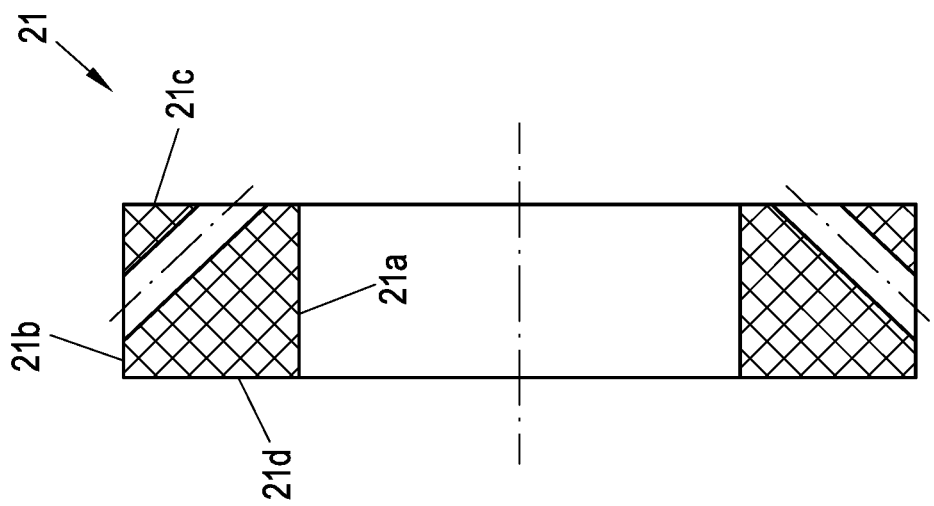
Figure 4B:
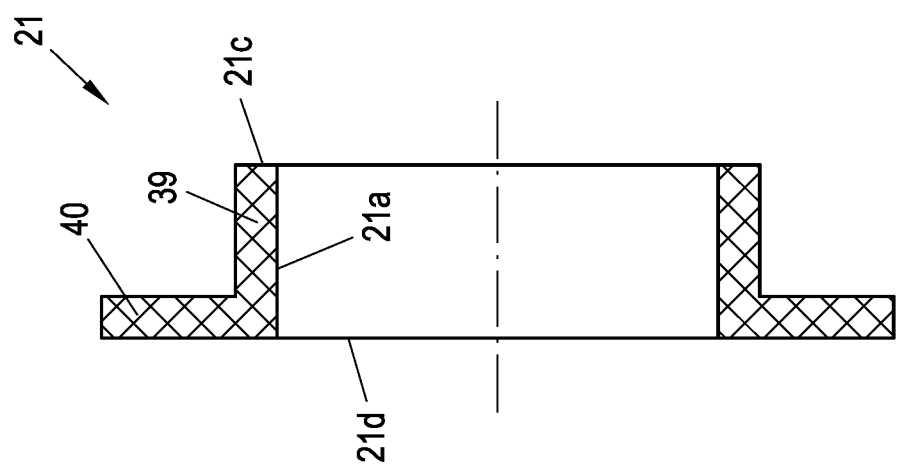
Figure 4A:
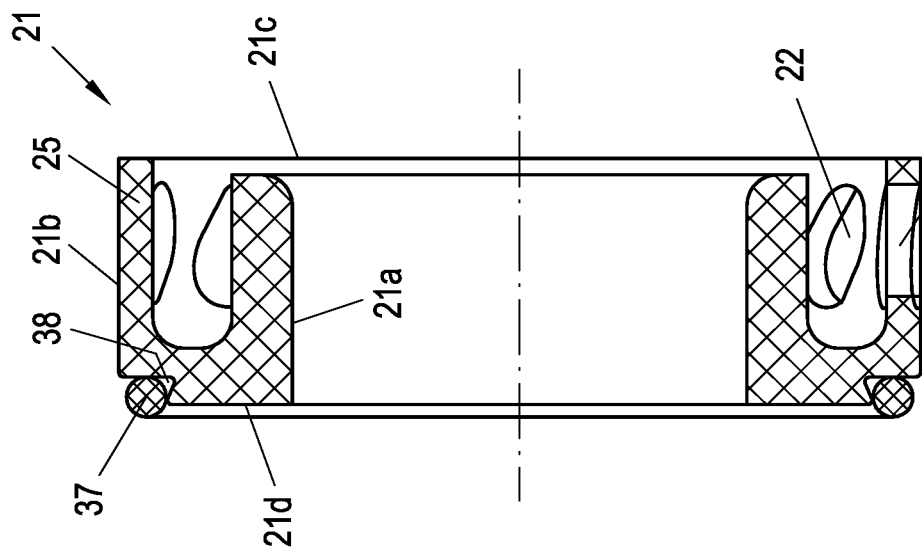

FIG. 4a shows a U-shaped second packing ring 21, which is essentially similar to the ring shown in FIG. 3a-3c. Therefore, only the differences will be described in detail. The second packing ring 21 according to FIG. 4a additionally comprises an O-ring 37, which has a relatively high elasticity, in particular much higher than the material of the second packing ring 21. The O-ring is arranged on a shoulder, which is formed by a circumferential groove 38. The circumferential groove 38 is positioned adjacent the outer circumferential surface 21b and adjacent to the surface of the second packing ring 21 at the second axial end 21d. As can be seen in FIG. 4a, a diameter of the O-ring 37 is slightly larger than the axial depth of the groove 38 in the unmounted state. In the mounted state of the second packing ring 21, the O-ring 37 essentially acts like a spring. The O-ring 37 helps sealing in the radial direction (between the second axial end 21d of the second packing ring 21 and the axial wall of the retaining opening 20a—see FIG. 2a), when the second packing ring 21 is in its cold state, since in the cold state, the axial length of the second packing ring 21 is smaller than in the hot state due to thermal expansion, which also acts in the axial direction. In the hot state, when the second packing ring 21 is thermally expanded in the axial direction, the O-ring 37 is compressed and compensates the axial change in length. Thus, the mechanical stress on the outer shank 25 of the second packing ring 21 can be decreased.

FIG. 4b shows a cross section of another preferred embodiment of the second packing ring 21. As can be seen, the second packing ring 21 has an L-shaped cross section. This allows for a very simple manufacturing, since no openings 22 are necessary in this embodiment. Like the U-shaped ring of FIG. 3a-3c and FIG. 4a, the second axial end 21d of the L-shaped second packing ring 21 of FIG. 4b also faces in the direction of the first axial device end 15a (or the cylinder 9 respectively—see FIG. 1) of the sealing device 15 or the high-pressure side HP respectively (see FIG. 2a). Of course, an O-ring (not shown), similar as in FIG. 4a, could additionally be provided on the L-shaped packing ring 21 of FIG. 4b.

FIG. 4c shows a cross section of another preferred embodiment of the second packing ring 21. In this embodiment, the second packing ring 21 comprises a rectangular cross section. In order to allow gas to flow from the first axial end 21c (cylinder side) to the ring's outer circumferential surface 21b, a number of openings 41 are provided, which in each case connect the first axial end 21c of the second packing ring 21 with the outer circumferential surface 21b of the of the second packing ring 21. The openings 41 can essentially have any suitable form, e.g., inclined drillings, as shown in FIG. 4c, or intersecting and preferably perpendicular axial and radial openings.

According to the invention the sealing device 15 further comprises a support passage 28 having a first support passage end 28a and a second support passage end 28b, as indicated in FIG. 2a. For the sake of simplicity, a part of the support passage 28 is only shown schematically in FIG. 2a. In the shown embodiment, the first support passage end 28a of the support passage 28 is connected to the retaining opening 20a of the second packing retainer 20 in a region radially outside of the second packing ring 21. In particular, the first support passage end 28a opens into a space, which is formed between the outer circumferential surface 21b of the second packing ring 21 and the inner circumferential surface of the retaining opening 20a, in which the second packing ring 21 is arranged. However, this is only an exemplary embodiment and the first support passage end 28a of the support passage 28 does not necessarily need to be connected to the retaining opening 20a. It could as well be located between the second packing ring 21 and the subsequent first packing ring 19, for instance on an inner circumferential surface of the intermediate plate 27. However, if the second packing retainer 20 was designed in another fashion, the first support passage end 28a of the support passage 28 could for instance also be located at an inner circumferential surface of the second packing retainer 20, next to the retaining opening 20a towards the first axial device end 15a. Further a valve 29 for opening and closing the support passage 28 is provided between the first support passage end 28a and the second support passage end 28b.

As depicted in FIG. 2a, a first part of the support passage 28 is integrally formed with the second packing retainer 20, while and a second part of the support passage 28 lies outside of the second packing retainer 20. The second part of the support passage 28 can e.g., be implemented as a conduit, which is connected to the second packing retainer 20 by means of a suitable connector. In the shown embodiment, the connector is arranged on an axial face of the second packing retainer 20, facing towards the second device end 15b of the sealing device 15. However, also another position is possible, e.g., on a radial outer circumference, provided, that there is sufficient space for connecting the second part of the support passage 28.

In the shown example, the second packing retainer 20 also serves as a mounting flange for mounting the sealing device 15 on the compressor 1. For the sake of simplicity, mounting elements, such as screws or the like, are not shown in FIG. 2a. Of course, this is not necessary and the second packing retainer 20 could also be provided in the form of a separate component in addition to the mounting flange, in particular adjacent the mounting flange in the direction of the first axial device end 15a. In this case the first part of the support passage 28 (adjacent the first passage end 28a) can be integrally formed with the second packing retainer 20, a second (intermediate) part of the support passage 28 can be integrally formed with the flange and a third part of the support passage 28 (adjacent the second passage end 28b) can again be implemented as a conduit. Of course, a suitable sealing element, such as an O-ring, can be arranged between the flange and the second packing retainer 20, in order to provide a seal between the first part of the support passage 28 (inside the second packing retainer 20) and the second part of the support passage 28 (inside the flange).

The support passage 28 has essentially two functions. During operation of the compressor 1 (e.g., when the operating temperature is reached and the second packing ring 21 is detached from the piston rod 8 due to the thermal activation, as described above) the function of the support passage 28 is to provide an essentially free leakage path for the gas, which flows from the cylinder 9 past the number of first packing rings 19 in the direction of the second device end 15b of the sealing device 15. Thus, the support passage 28 essentially prevents an undesired, relatively large, pressure drop, which would otherwise (without the passage 28) occur across the second packing ring 21 due to the relatively small gap (similar to a throttle), created between the inner circumferential sealing surface 21a of the second packing ring 21 and the outer circumferential surface 8a of the piston rod 8 in the detached state. The valve 29 is of course open during operation of the compressor 1.

On the other hand, in the activated sealing state of the second packing ring 21 at standstill of the compressor 1 (e.g., at or below the activation temperature), a tight sealing barrier is formed between the second packing ring 21 and the piston rod 8. In order for the second packing ring 21 to unfold its desired sealing effect, the valve 29 of the support passage of course needs to be in its closed position, because otherwise the gas would not be contained and would flow through the support passage 28 in the direction of the second support passage end 28b. In order to automatically control the opening/closing of the valve 29, it is advantageous, that the valve 29 comprises an electrically controllable actuator 30, which can be controlled by a control unit (e.g., the compressor control unit 17, as shown in FIG. 2a) in order to open and close the valve 29.

According to the invention, the sealing device 15 further comprises an unobstructed vent passage 31, comprising a first vent passage end 31a and an opposite second vent passage end 31b. The vent passage 31 is configured to vent a gas, leaking from the first axial device end 15a (or the cylinder 9 respectively) in the direction of the second axial device end 15b (or the distance piece 3 respectively) past the number of first packing rings 19 and past the second packing ring 21 (in particular between the inner circumferential surface 21a of the second packing ring 21 and the outer circumferential surface 8a of the piston rod 8), from the first vent passage end 31a to the second vent passage end 31b. This enhances the safety at compressor standstill, because gas, leaking past the second packing ring 21, e.g., due to the second packing ring 21 being worn out, damaged or completely broken, can at any time be safely vented through the unobstructed vent passage 31.

Preferably the sealing device 15 further comprises at least one third packing retainer 32 including a retaining opening 32a, in which a third packing ring 33 is arranged, as shown in FIG. 2a. The at least one third packing retainer 32 can essentially be designed in a similar fashion as the number of first packing retainers 18. However, as can be seen in FIG. 2a, different types of packing rings can be used for the third packing ring 33 and for the first packing ring 19. Therefore, the size of the retaining opening 32a of the third packing retainer 32 can be different than the size of the retaining opening 18a of a first packing retainer 18.

The third packing retainer 32 is arranged closer to the second axial device end 15b of the sealing device 15 than the second packing retainer 20. Similar as described above in connection with the intermediate plate 27, the retaining opening 32a of the third packing retainer 32 is delimited by the axial front face of the second packing retainer 20, which front face faces towards the second device end 15b of the sealing device 15. Similar to the first packing rings 19, the at least one third packing ring 33 can for instance comprise multiple ring segments in the axial direction and/or multiple ring segments in the circumferential direction. In the shown example in FIG. 2a, a single third packing retainer 32 is provided and the third packing ring 33, which is arranged in the retaining opening 32a of the third packing retainer 32, comprises three sealing rings consecutively arranged in the axial direction, wherein each of the sealing rings comprises multiple ring segments in the circumferential direction. Such rings are known in art, as already mentioned above in connection with the first packing ring 19.

Similar to the first packing retainers 18 and the second packing retainer 20, also the third packing retainer 32 can either be made from one piece, in which the retaining opening 32a is arranged, e.g., milled, or can be assembled from more than one piece. For instance, the third packing retainer 32 can comprise a face plate and an adjacent piece, in which the third packing ring 33 is arranged. The face plate can e.g., be a cylindrical plate such as the intermediate plate 27 and the adjacent piece can e.g., be a hollow cylinder.

If a third packing retainer 32 is provided in the sealing device 15, the first vent passage end 31a of the unobstructed vent passage 31 can be directly connected to the retaining opening 32a of the third packing retainer 32, preferably to a space, which is formed radially outside of the third packing ring 33, as shown in the example according to FIG. 2a. Again, as described in connection with the support passage 28, a first part of the vent passage 31, adjacent the first vent passage end 31a, can be integrally formed with the third packing retainer 32 and a second part of the vent passage 31, adjacent the second vent passage end 31b, can be formed by means of a conduit. However, FIG. 2a only shows an exemplary embodiment and similar to the first support passage end 28a of the support passage 28, the first vent passage end 31a of the vent passage 31 could as well be arranged at a different location. For example, the first vent passage end 31a could be located between the third packing ring 33 and the second packing ring 21 in the axial direction of the sealing device 15, e.g. on the inner circumferential surface of the second packing retainer 20.

As can be depicted from FIG. 2a, the second vent passage end 31b of the unobstructed vent passage 31 and the second support passage end 28b of the support passage 28 are preferably connected to a common discharge passage 34, which is connectable to a discharge space 35. Due to the vent passage 31 being unobstructed, at any time gas, which leaks past the second packing ring 21 can be safely discharged into the discharge space 35. The discharge space 35 can for instance be a reservoir for storing the gas, such as a tank, or it could also be a disposal system for disposing the gas, such as a flare device for burning the gas. This allows for a very safe operation, because even in case of a breakdown of the second packing ring 21 gas is safely discharged through the vent passage 31 and does therefore not enter into the distance piece 3 at standstill of the compressor 1, in which the valve 29 is in its closed position.

In the shown example, in which the valve 29 of the support passage 28 can be actuated (opened/closed) by means of an electrically controllable actuator 30, the actuator 30 can preferably be controlled dependent on an operation condition of the compressor 1. For instance, a logic, according to which the actuator 30 of the valve 29 is controlled dependent on a start signal S_start and/or stop signal S_stop for the drive unit 16, can be implemented in the control unit 17. The control unit 17 can for instance be configured to send a start signal S_start to the drive unit 16 for starting the operation of the compressor 1, as indicated in FIG. 2a. Additionally, the control unit 17 can send an opening signal S_open to the actuator 30 of the valve 29 of the support passage 28 for opening the valve 29. The opening signal S_open can either be sent simultaneously with the start signal S_start, such that the valve 29 is immediately opened upon startup. Alternatively, the opening signal S_open can be sent a predetermined or adjustable opening lead time before the start signal S_start is sent, such that the valve 29 is opened a certain time prior to startup. The starting lead time can preferably be in the range between 0 to 60 seconds. By this, it is guaranteed, that valve 29 is open at the moment the compressor starts.

The control unit 16 can also be configured to send a stop signal S_stop to the drive unit 16 to for stopping the operation of the compressor 1 and can further send a closing signal S_close to the actuator 30 of the valve 29 of the support passage 28 for closing the valve 29. Again, the closing signal S_close can be sent simultaneously with the stop signal S_stop or after a predetermined or adjustable closing delay time after the stop signal S_stop has been sent. The closing delay time is preferably also in the range between 0 to 120 seconds. Although a simultaneous sending is possible, this is not necessary, since according to the invention the second packing ring 21 is thermally activated and not by the differential pressure. A certain closing delay time can e.g., be advantageous in order to make sure, that the piston rod 8 is at a complete standstill, before the valve 29 is closed, such that a contact and possible wear of the second packing ring 21 can in any case be avoided.

The valve 29 preferably also comprises a sensor 36 for detecting an opening state of the valve 29. The sensor 36 is configured to transmit a sensor value X, representative for the opening state (e.g., opened or closed position) to the control unit 17. The control unit 17 can then process the sensor value X and can for instance send the start signal S_start to the drive unit 16, only when a sensor signal X, representative for an open state of the valve 29, is received. The compressor 1 is therefore only started, when the valve 29 is open and a start can be prevented as long as the valve 29 is closed. This prevents the compressor 1 to start with the valve 29 closed and therefore a high differential pressure acting on the second packing ring 21, which could possibly push the packing ring 21 too hard onto the piston rod 8, which might create overheat, excessive wear or possible mechanical failure.

According to another preferred embodiment, the compressor 1 can comprise a suitable operation condition sensor (not shown), which is configured to detect a sensor value, representative for an operation condition of the compressor 1. The operation condition sensor can e.g., be a temperature sensor, which is configured to sense the operation temperature. The temperature sensor can be arranged at a suitable position in order to sense the operating temperature e.g., in the region of the second packing ring 21 and/or in the region of the piston rod 8. The operation condition sensor can be connected to the control unit 17 for submitting the sensor value to the control unit 17. The control unit 17 can further be configured to control the valve 29 of the support passage 28 dependent on the sensor value, in particular the operating temperature. On the other hand, valve 29 could also be directly controlled by the operation condition sensor, such that no control by the control unit 17 is necessary. In this case, for instance a thermally actuated valve can be used as the valve 29, which is essentially a combination of the valve 29, the actuator 30 and the operation condition sensor. Thus, the actuator 30 of the valve 29 can open and close the valve 29 automatically dependent on the detected sensor value, without a control intervention of the control unit 17 being required.

According to an alternative embodiment, the operation condition sensor could e.g., be a movement sensor, which is configured to detect a sensor value, representative of a movement of a moving part of the compressor 1. The movement sensor can for instance be a speed sensor for detecting a rotational speed of the crankshaft or a translational speed of the piston rod 8 or the like. The movement sensor can again be connected to the control unit 17, wherein the control unit 17 is configured to control the actuator 30 of valve 29 depending on the sensor value of the movement sensor. On the other hand, the movement sensor can again be implemented in the valve 29 together with the actuator 30, such that the valve 29 is directly actuated, independently from the compressor control unit 17. Of course, the temperature sensor and the movement sensor are only examples and other sensors, which are suitable to detect relevant sensor values, which are representative for the operation condition of the compressor 1 could also be used. In a preferred embodiment, the activating values of the measured sensor value, e.g., temperature, rotational speed, etc., at which the valve 29 is to be closed or opened, can be adjusted, e.g., via the control unit 17 or directly at the valve 29 or the actuator 30.

Figure 2B:
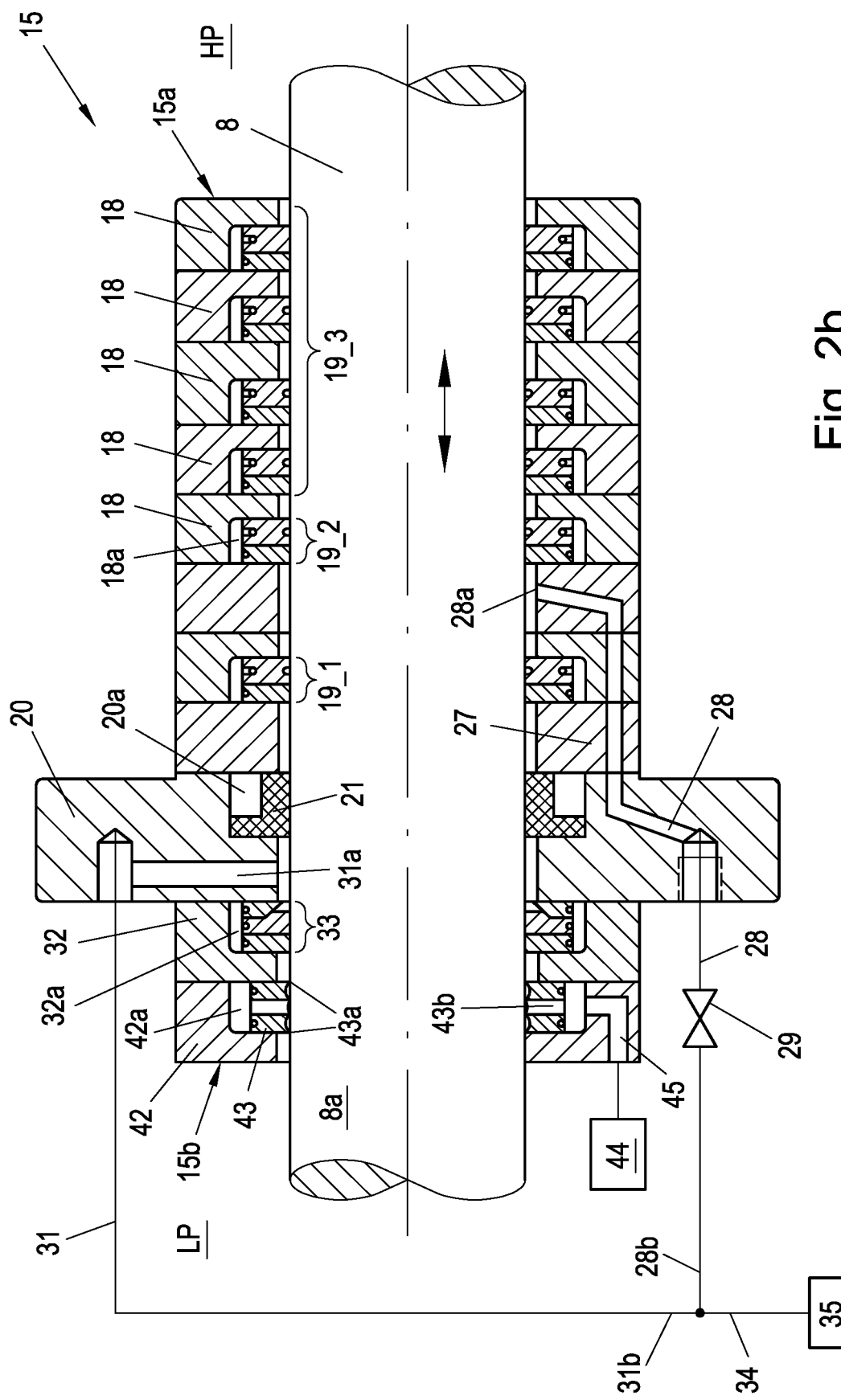

Although not shown in the example according to FIG. 2a, further packing retainers could additionally be arranged in the sealing device 15. For instance, it would be conceivable to add a fourth packing retainer 42 adjacent the third packing retainer 32, the fourth packing retainer 42 being closer to the second axial device end 15b, than the third packing retainer 32. An exemplary embodiment is shown in FIG. 2b. The fourth packing retainer 42 includes a retaining opening 42a, in which a wiper ring 43 is arranged, which wiper ring 43 serves for wiping residual oil from the outer circumferential surface 8a of the piston rod 8. A wiper ring 43 can comprise one or more wiping edges 43a on the inner circumferential surface. The wiper ring 43 can further comprise one or more discharge channels 43b, connecting an inner circumferential surface of the wiper ring 43 with an outer circumferential surface. Through the discharge channel(s) 43b wiped oil can be transferred to an oil collecting space, provided inside the retaining opening 42a arranged radially outside of the wiper ring 43. The discharge space can be connected to an oil reservoir 44 by means of a suitable oil return line 45. Since such wiper rings 43 are known in the art, there will be no further detailed description at this point. Such an embodiment of the sealing device 15, that includes a wiper ring 43, can for instance be used in a compressor 1, which does not have a distance piece 3 like the compressor 1 shown in FIG. 1. Such a sealing device 15 is often referred to a so-called combined sealing device.

Similar as the embodiment according to FIG. 2a, the sealing device 15 according to FIG. 2b also comprises a support passage 28 including a valve 29 and an unobstructed vent passage 31. Since the function of the support passage 28 and the function of the vent passage 31 were already described in detail in connection with FIG. 2a, only the differences between the two embodiments will be described in the following. Unlike in FIG. 2a, in the embodiment of FIG. 2b the first vent passage end 31a of the vent passage 31 is located between the third packing ring 33 and the second packing ring 21 in the axial direction of the sealing device 15 (or the piston rod 8 respectively). A first part of the vent passage 31 is integrally formed in the second packing retainer 20, in which the second packing ring 21 is arranged. The first vent passage end 31a in this case is located on the inner circumferential surface of the second packing retainer 20. In the shown example, the second packing retainer 20 also serves as a mounting flange for mounting the sealing device 15 on the compressor 1. Of course, suitable mounting means (not shown), such as bolts or screws, can be provided on the flange. The function of the vent passage 31 is however the same, as in FIG. 2a. Such a design is advantageous, because a standardized packing retainer (without an integrated passage) can be used the third packing retainer 32.

In the embodiment according to FIG. 2b the location of the first support passage end 28a of the support passage 28 also differs from the embodiment according to FIG. 2a. In FIG. 2a, the first support passage end 28a is directly connected to the retaining opening 20a of the second packing retainer 20. Contrary to that, in FIG. 2b the first support passage end 28a is located between the first packing ring 19_1, that is arranged adjacent the second packing ring 21, and the subsequent first packing ring 19_2 in the direction of the first axial device end 15a of the sealing device 15. This design has essentially two advantages for the preferred embodiment regarding the thermally activated second packing ring 21. On the one hand, this configuration allows the first packing ring 19_1, that is adjacent the second packing ring 21, to provide an additional seal during the time between a shut-off of the compressor 1 and the thermal activation of the second packing ring 21, which activation is delayed due to necessary time for cooling down and shrinking. Therefore, until the point, at which the sealing effect of the second packing ring 21 unfolds entirely, the first packing ring 19_1 can provide an additional sealing effect due to the remaining pressure in the cylinder 9 (FIG. 1).

In order to provide such an additional sealing effect, it is advantageous, that the first packing ring 19_1, which is adjacent the second packing ring 21, is designed differently than the subsequent first packing ring 19_2 (and differently than the further first packing rings 19_3, which are arranged adjacent the first packing ring 19_2 towards the first axial device end 15a in FIG. 2b). In particular, the first packing ring 19_1 is preferably designed as a so-called "double-acting" ring, which is configured to provide a sealing effect also in absence of a differential pressure over the ring. A double-acting ring can for example comprise a ring assembly with two tangentially cut rings, e.g., two identical tangentially cut rings. Another suitable ring would e.g., be a so-called "tangential to rod" ring. Such rings are known in the art. The first sealing ring 19_2 and the subsequent first sealing rings 19_3 can for example be identical and can e.g., each comprise a ring assembly with a radially cut ring and a tangentially cut ring, as already mentioned in connection with the first packing rings 19 in FIG. 2a. On the other hand, the pressure-drop over the first packing ring 19_1, that is adjacent the second packing ring 21, can be used for cooling the second packing ring 21, which accelerates the cooling down and hence the thermal activation. In this case it is particularly preferable, if the respective first packing ring 19_1 comprises a metal material. For instance, the above-mentioned backup ring, made of metal, can be used as a part of the first packing ring 19_1.

Another preferred embodiment of the sealing device 15 of the invention will be explained in connection with FIG. 2c. The number of first packing retainers 18 of the sealing device 15 of the shown embodiment comprises two first packing retainers 18, each having a retaining opening 18a, in which a first packing ring 19 is arranged. The first packing rings 19 can again be designed, as was described earlier. Of course, a larger number of first packing retainers 18 could also be provided, similar as shown in FIG. 2a+2b. The sealing device 15 further comprises a second packing retainer 20, having a retaining opening 20a, in which the second packing ring 21 is arranged. The second packing retainer 20 is arranged closer to the second device end 15b than the first packing retainers 18. An exemplary U-shaped second packing ring 21 is shown. However, the second packing ring 21 could have a different design, as was described in connection with FIG. 3a-FIG. 4c. Adjacent the second packing retainer 20, an intermediate plate 27 is arranged, in which a first part of the unobstructed vent passage 31 is arranged. As can be seen, the first vent passage end 31a of the vent passage 31 is located between the second packing ring 21 and the subsequent first packing ring 19 in the direction of the second device end 15b, similar as in the embodiment according to FIG. 2b.

The sealing device 15 further comprises a fifth packing retainer 46 having a T-like cross section and comprising two retaining openings 46a, which are separated by a central part of the T-like cross section in the axial direction. In each of the retaining openings 46a a fifth packing ring 47 is arranged. The fifth packing rings 47 are each formed as a so-called single-acting SLP-ring assembly, which comprises three consecutive rings in the axial direction, wherein each of the three rings being a cut ring, comprising multiple ring segments in the circumferential direction. The central ring and one of the outer rings each comprise a chamfer, wherein the chamfer of the central ring faces towards the outside in the radial direction and the chamfer on the outer ring faces towards the inside in the radial direction. The chamfers face each other and are in contact.

Figure 2C:
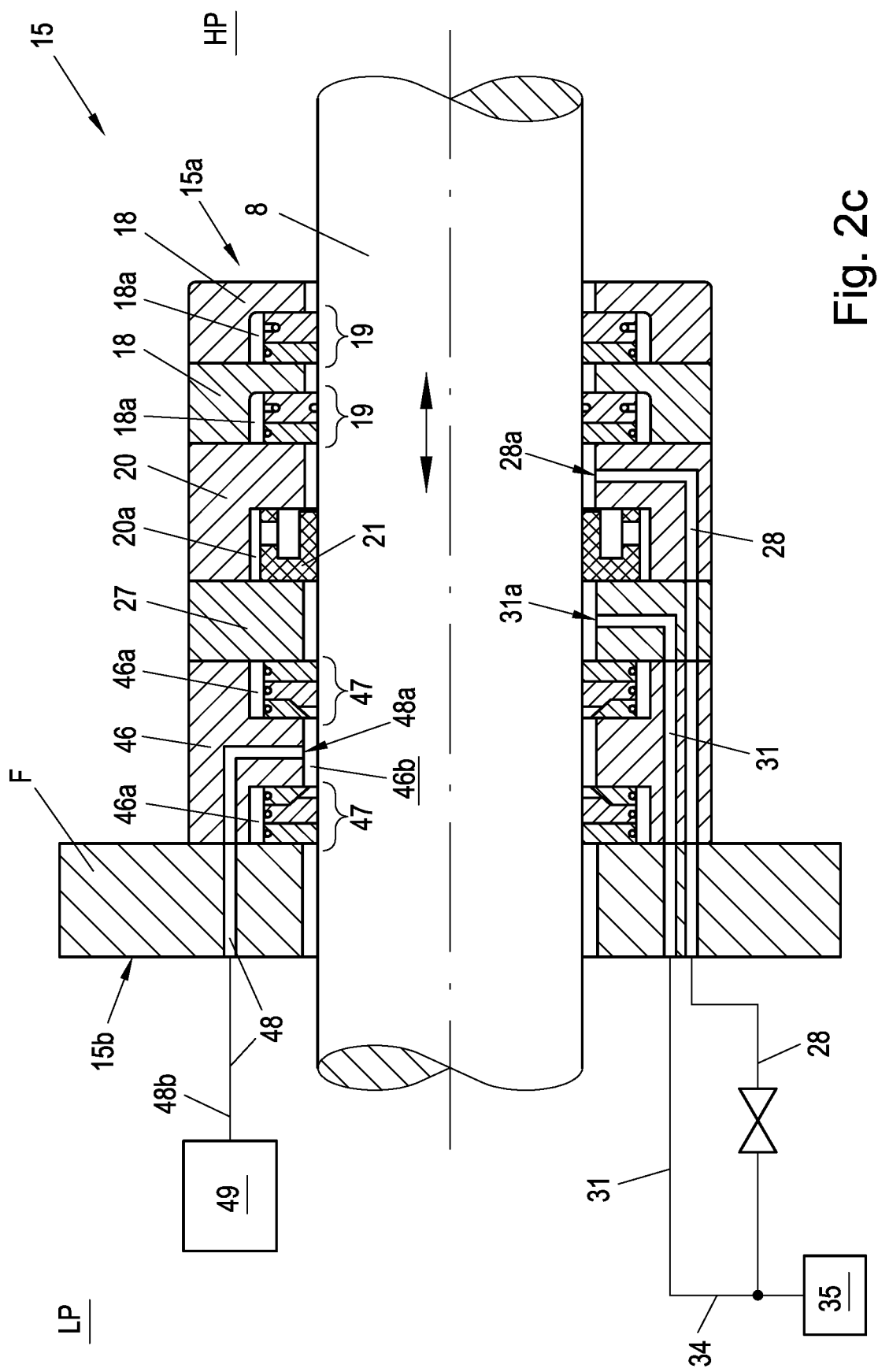

As indicated in FIG. 2c, the two fifth packing rings 47 are arranged mirror-inverted, such that the outer chamfered rings face each other in the axial direction and are in contact with the central part of the T-like cross section of the fifth packing retainer 46. In the mounted state of the sealing device 15 in the compressor 1, a pressure chamber 46b is formed in a space, which is located between the two fifth packing rings 47 in the axial direction and between the central part of the T-like cross section of the fifth packing retainer 46 and the piston rod 8 in the radial direction. Further a flange F for mounting the sealing device 15 on the compressor 1 is arranged in the sealing device 15. The flange F is arranged on the very left and comprises the second axial device end 15b of sealing device 15, that is configured to face towards the crankcase 2 (FIG. 1). As can be seen in FIG. 2c, the Flange F delimits the left retaining opening 46a of the fifth packing retainer 46, which is closer to the second device end 15b and the intermediate plate 27 delimits the right retaining opening 46a of the fifth packing retainer 46, which is closer to the first device end 15a.

Further a purge passage 48 is provided on the sealing device 15, the purge passage 48 having a first purge passage end 48a and a second purge passage end 48b. The first purge passage end 48a is located on the inner circumferential surface of the on the central part of the T-like cross section of the fifth packing retainer 46 between the two fifth packing rings 47 in the axial direction. A first part of the purge passage 48, adjacent the first purge passage end 48a, is integrally formed in the fifth packing retainer 46, a second intermediate part of the purge passage 48 is integrally formed in the flange F and a third part of the purge passage 48, adjacent the second purge passage end 48b, is formed as a conduit, which is suitably connected to the flange F. The second purge passage end 48b is connected to a source 49 of pressurized gas, preferably comprising nitrogen. A valve (not shown) for opening/closing the purge passage 48 could also be provided.

When the pressurized gas from the source 49 is introduced into the pressure chamber 46b, a pressure is generated inside the pressure chamber 46b, which presses the respective outer chamfered ring of each fifth packing ring 47 onto the respective central ring in the axial direction. Due to the interacting chamfers, the central chamfered rings are pressed onto the piston rod 8 in the radial direction in order to form a tight seal. Gas, leaking from the first device end 15a (or the compression chamber 9 respectively—FIG. 1) past the first packing rings 19 and past the second packing ring 21 in the direction of the second device end 15b, can thus be safely vented through the unobstructed vent passage 31. This is not only due to the sealing effect of the fifth packing rings 47, but also due to the pressure in the pressure chamber 46b preferably being higher than the pressure in the region of the first vent passage end 31a.

Figure 2D:
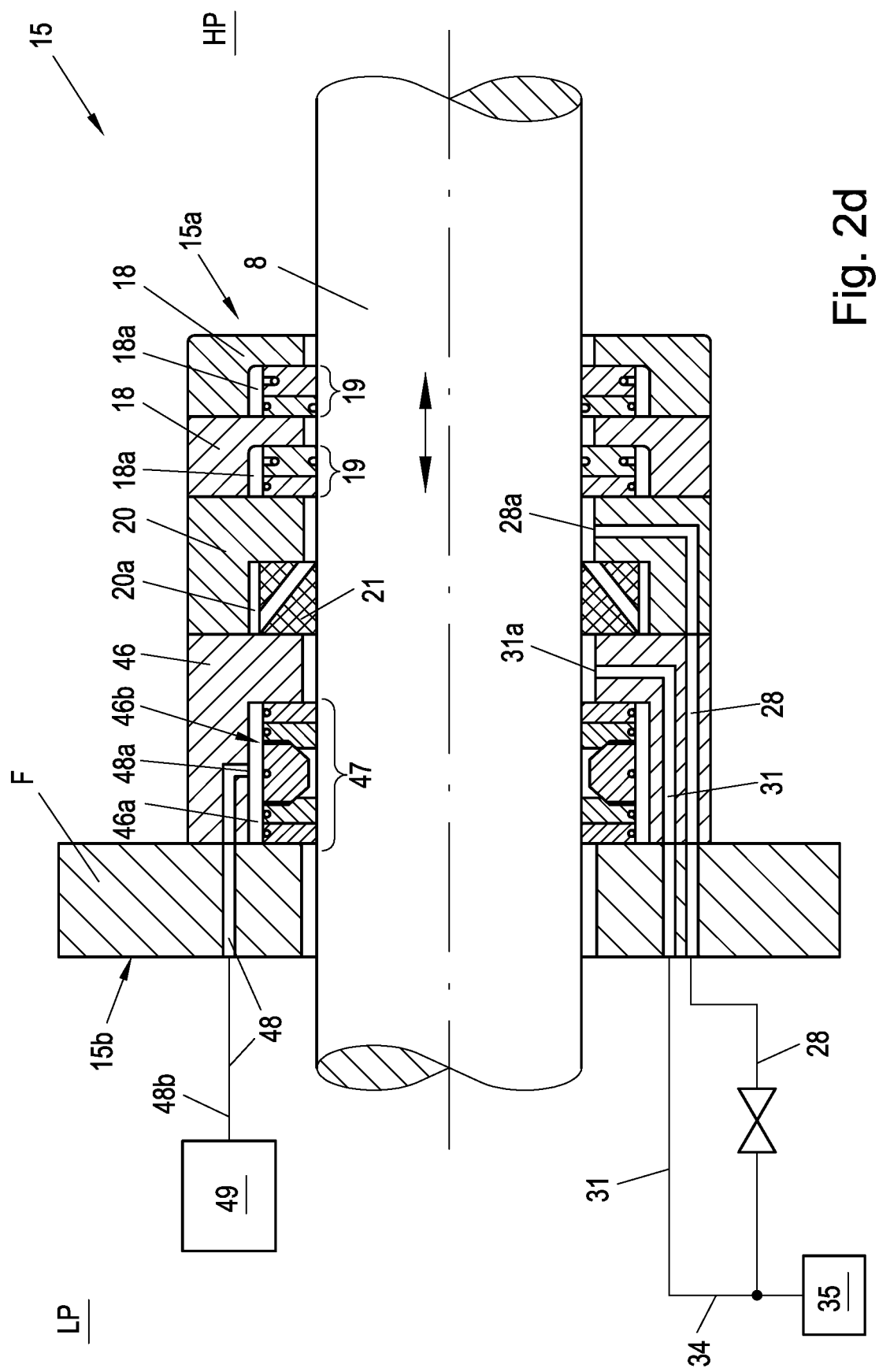

FIG. 2d shows a different design of the sealing device 15 including a fifth packing retainer 46. In this case the fifth packing retainer 46 has an L-shaped cross section and only comprises a single retaining opening 46a. The retaining opening 46a faces in the direction of the second axial device end 15b of the sealing device 15 and is delimited by the flange F in the axial direction. In the retaining opening 46a only one fifth packing ring 47 is arranged, which is designed differently than the fifth packing ring 47 of FIG. 2c. The fifth packing ring 47 in this case is a so-called double acting DSLP-ring assembly. The DSLP-ring assembly is essentially a combination of the above-mentioned SLP-ring assembly, in which the respective outer chamfered rings are combined to a single central ring, having chamfers on both sides in the axial direction. Hence, the fifth packing ring 47 of FIG. 2c comprises five consecutive rings in the axial direction, each ring having multiple ring segments in the circumferential direction.

The first purge passage end 48a of the purge passage 48 is connected to a space inside the retaining opening 46a, located radially outside of fifth packing ring 47, which space forms the pressure chamber 46b. The axial position of the first purge passage end 48a is preferably in the center of the retaining opening 46a, however also another position would be possible. Again, a first part of the purge passage 48, adjacent the first purge passage end 48a, is integrally formed in the fifth packing retainer 46 and a second intermediate part of the purge passage 48 is integrally formed in the flange F. The third part of the purge passage 48, adjacent the second purge passage end 48b, lies outside of the flange F and can be implemented as a conduit. The conduit is connected to a source of pressurized gas (not shown). Further, in the embodiment according to FIG. 2d, the unobstructed vent passage 31 also passes through the fifth packing retainer 46 as well as through the flange F.

The purge passage 48 is spaced from the vent passage 31 in the circumferential direction, in order to not interfere with the vent passage 31. Like in FIG. 2c, the first vent passage end 31a of the vent passage 31 is located between the second packing ring 21 and the fifth packing ring 47 in the axial direction of the sealing device 15. However, no intermediate plate 27 as in FIG. 2c is necessary in the embodiment of FIG. 2d. The overall axial length of the sealing device 15 according to FIG. 2d can therefore be slightly smaller than the length of the sealing device according to FIG. 2c. The second packing ring 21 is designed according to the embodiment of FIG. 4c. However, any other of the described designs would of course be possible as well.

The invention claimed is:

1. Sealing device for sealing a piston rod of a reciprocating compressor, the sealing device comprising a first axial device end, configured to face toward a cylinder of the compressor, and an opposite second axial device end, configured to face toward a crankcase of the compressor, a number of first packing retainers, each retainer including a retaining opening in which one of a number of first packing rings is arranged, a second packing retainer, including a retaining opening in which a second packing ring is arranged, the second retainer being positioned closer to the second axial device end than the number of first packing retainers in an axial direction of the sealing device, wherein the second packing ring is an uncut ring, comprising a continuous inner circumferential sealing surface, the second packing ring being configured to seal the piston rod at standstill of the compressor, wherein the sealing device further comprises a support passage having a first support passage end, a second support passage end and a valve for opening and closing the support passage, the support passage being configured to vent a gas, leaking from the first axial device end in the direction of the second axial device end past at least one of the number of first packing rings, from the first support passage end to the second support passage end, wherein the sealing device further comprises an unobstructed vent passage having a first vent passage end and a second vent passage end, the vent passage being configured to vent a gas, leaking from the first axial device end in the direction of the second axial device end past the second packing ring, from the first vent passage end to the second vent passage end.

2. Sealing device according to claim 1, wherein the first support passage end is connected to the retaining opening of the second packing retainer, or wherein the first support passage end is located between the second packing ring and the first packing ring of an adjacent one of the number of first packing retainers in the axial direction of the sealing device, or wherein the first support passage end is located between the first packing ring, which is adjacent the second packing ring, and the first axial device end in the axial direction of the sealing device.

3. Sealing device according to claim 1, wherein the sealing device further comprises at least one third packing retainer including a retaining opening in which a third packing ring is arranged, wherein the at least one third packing retainer is arranged closer to the second axial device end of the sealing device than the second packing retainer, wherein the first vent passage end is connected to the retaining opening of the third packing retainer, or wherein the first vent passage end is located between the second packing ring and the third packing ring in the axial direction of the sealing device.

4. Sealing device according to claim 1, wherein the second vent passage end of the unobstructed vent passage and the second support passage end of the support passage are connected to a common discharge passage, which is connectable to a discharge space.

5. Sealing device according to claim 1, wherein the valve comprises an electrically controllable actuator, which can be controlled by a control unit in order to open and close the valve.

6. Sealing device according to claim 1, wherein the valve comprises a sensor configured to generate a sensor value, representative for an opening state of the valve.

7. Sealing device according to claim 1, wherein the second packing ring is made from a material comprising a polymer, the material having a thermal expansion coefficient, which is at least two times higher than a thermal expansion coefficient of iron, wherein at or below a defined activation temperature an inner diameter of the second packing ring is smaller than an outer diameter of the piston rod to be sealed, such that in a mounted state of the sealing device in the compressor the second packing ring is pre-stressed in a radial direction in order to form a tight seal between the continuous inner circumferential sealing surface of the second packing ring and an outer circumferential surface of the piston rod, wherein at a given operating temperature greater than the activation temperature, the inner diameter of the second packing ring is larger than the outer diameter of the piston rod, such that in the mounted state of the sealing device in the compressor the continuous inner circumferential sealing surface of the second sealing ring is detached from the outer circumferential surface of the piston rod in order to provide a leakage path past the second packing ring in the axial direction.

8. Sealing device according to claim 7, wherein the thermal expansion coefficient of the material of the second packing ring is at least $30 \times 10^{-6}$ K.

9. Sealing device according to claim 7, wherein the operating temperature is 90° C. or above and wherein the activation temperature is 80° C. or below, wherein the operating temperature and the activation temperature are temperatures in a region of the piston rod, in particular a temperature of the outer circumferential surface of the piston rod.

10. Sealing device according to claim 1, wherein the second packing ring has a first axial end and an opposite second axial end, wherein the second packing ring is arranged in the retaining opening of the second packing retainer, such that the first axial end faces towards the first axial device end of the sealing device and wherein the second packing ring comprises one of:
   a U-shaped cross section comprising an inner shank and an outer shank, which are spaced apart in a radial direction, wherein the inner circumferential sealing surface of the second packing ring is provided on the inner shank and a radially outer circumferential surface is provided on the outer shank of the second packing ring, wherein an open side of the U-shape faces toward the first axial end of the second packing ring in the axial direction,
   an L-shaped cross section comprising an axial shank and a radial shank, wherein the inner circumferential sealing surface of the second packing ring is provided on the axial shank and a radially outer circumferential surface of the second packing ring is provided on the radial shank, wherein the radial shank is arranged at the second axial end of the second packing ring,
   a rectangular cross section, wherein a number of openings are provided on the second packing ring, which openings in each case connect the first axial end of the second packing ring with an outer circumferential surface of the second packing ring.

11. Sealing device according claim 10, wherein a number of openings are provided on the outer shank, wherein each of the number of openings connects an inside space of the U-shaped packing ring with the radially outer circumferential surface of the second packing ring, the inside space lying between the inner shank and the outer shank in the radial direction, wherein the openings are spaced from the first and opposite second axial ends of the second packing ring.

12. Sealing device according claim 11, wherein the number of openings comprises a number of elongated holes or elliptical holes.

13. Sealing device according claim 12, wherein each elongated hole or elliptical hole comprises a longitudinal axis, a first hole end and an opposite second hole end in the direction of the longitudinal axis, wherein the first hole end is closer to the first axial end than the second hole end.

14. Sealing device according to claim 10, wherein in an unmounted state of the second packing ring, a length of the inner shank in the axial direction is smaller than a length of the outer shank in the axial direction.

15. Sealing device according to claim 7, wherein the material of the second packing ring is a fiber-reinforced composite material and wherein the polymer of the material of the second packing ring comprises a polymer selected from the group consisting of: polytetrafluoroethylene, polyphenylene sulphide, polyether ether ketone, polyimide, and polyamide.

16. Reciprocating piston compressor comprising a number of cylinders, in each of which cylinders a piston is arranged, that is movable in a reciprocating manner, wherein each piston is connected to a piston rod, wherein for at least one cylinder of the number of cylinders, a sealing device is provided for sealing a respective piston rod, the sealing device comprising a first axial device end, configured to face toward a cylinder of the compressor, and an opposite second axial device end, configured to face toward a crankcase of the compressor, a number of first packing retainers, each retainer including a retaining opening in which one of a number of first packing rings is arranged, a second packing retainer, including a retaining opening in which a second packing ring is arranged, the second retainer being positioned closer to the second axial device end than the number of first packing retainers in an axial direction of the sealing device, wherein the second packing ring is an uncut ring, comprising a continuous inner circumferential sealing surface, the second packing ring being configured to seal the piston rod at standstill of the compressor, wherein the sealing device further comprises a support passage having a first support passage end, a second support passage end and a valve for opening and closing the support passage, the support passage being configured to vent a gas, leaking from the first axial device end in the direction of the second axial device end past at least one of the number of first packing rings, from the first support passage end to the second support passage end, wherein the sealing device further comprises an unobstructed vent passage having a first vent passage end and a second vent passage end, the vent passage being configured to vent a gas, leaking from the first axial device end in the direction of the second axial device end past the second packing ring, from the first vent passage end to the second vent passage end.

17. Reciprocating piston compressor according to claim 16, comprising the sealing device, wherein the sealing device further comprises the support passage having the first support passage end, the second support passage end and the valve for opening and closing the support passage, wherein the compressor comprises a compressor control unit for controlling an operation of the compressor, wherein the control unit is configured to control an electrically controllable actuator of the valve of the support passage dependent on an operation condition of the compressor.

18. Reciprocating piston compressor according to claim 17, wherein the compressor comprises an operation condition sensor, configured to detect a sensor value, representative for the operation condition of the compressor, and wherein the electrically controllable actuator of the valve of the support passage is configured to control the valve dependent on the sensor value or wherein the control unit is configured to control the electrically controllable actuator of the valve dependent on the sensor value.

19. Reciprocating piston compressor according to claim 17, wherein the compressor comprises a drive unit for driving the compressor, wherein the compressor control unit is configured to send a start signal to the drive unit for starting the operation of the compressor and to send an opening signal to the actuator of the valve of the support passage for opening the valve simultaneously with the start signal or a predetermined or adjustable opening lead time before the start signal, and/or wherein the control unit is configured to send a stop signal to the drive unit for stopping the operation of the compressor and to send a closing signal to the actuator of the valve of the support passage for closing the valve simultaneously with the stop signal or after a predetermined or adjustable closing delay time after the stop signal.

* * * * *